(12) United States Patent
Karaoguz et al.

(10) Patent No.: US 8,787,184 B2
(45) Date of Patent: Jul. 22, 2014

(54) COLLABORATIVE SHARING OF LOCATION INFORMATION AMONG DEVICES IN A NETWORK

(75) Inventors: Jeyhan Karaoguz, Irvine, CA (US); Charles Abraham, Los Gatos, CA (US); Mark Buer, Gilbert, AZ (US); David Garrett, Tustin, CA (US); David Albert Lundgren, Mill Valley, CA (US); David Murray, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 380 days.

(21) Appl. No.: 12/748,039

(22) Filed: Mar. 26, 2010

(65) Prior Publication Data
US 2011/0199917 A1    Aug. 18, 2011

Related U.S. Application Data

(60) Provisional application No. 61/303,975, filed on Feb. 12, 2010.

(51) Int. Cl.
*H04J 1/16*     (2006.01)
*H04W 4/02*   (2009.01)
(52) U.S. Cl.
CPC .................................... *H04W 4/023* (2013.01)
USPC ......................... 370/252; 370/338; 455/456.1

(58) Field of Classification Search
USPC ............... 370/252, 315, 328, 338; 455/404.2, 455/440, 456.1–456.6
See application file for complete search history.

(56) References Cited

U.S. PATENT DOCUMENTS

| | | | |
|---|---|---|---|
| 7,031,725 B2 * | 4/2006 | Rorabaugh | ................ 455/456.1 |
| 2003/0225893 A1 | 12/2003 | Roese | |
| 2005/0288037 A1 * | 12/2005 | Marinier | .................... 455/456.2 |
| 2009/0005069 A1 * | 1/2009 | McAlexander | ............ 455/456.1 |
| 2009/0264137 A1 * | 10/2009 | Soliman | ..................... 455/456.1 |
| 2010/0246438 A1 * | 9/2010 | Potkonjak | ..................... 370/254 |

* cited by examiner

*Primary Examiner* — Kan Yuen
(74) *Attorney, Agent, or Firm* — Sterne, Kessler, Goldstein & Fox P.L.L.C.

(57) ABSTRACT

A wireless communication device determines its location and communicates the location to other local devices utilizing a nonstandard, standard and/or proprietary protocol in combination with another protocol such as a Bluetooth, RFID, IEEE 802.11 and/or a cellular phone protocol. The location may be determined utilizing a GNSS receiver and/or network device information. A new location may be determined based on the determined location, a relative distance and/or a relative direction to other local devices. Determined location information may be communicated to other devices via a network. The wireless communication device may receive locations and/or corresponding location uncertainties from devices located within a limited range. The received information is utilized to determine a more accurate location. The more accurate location is communicated back to the devices within the limited range and/or to other communication devices.

18 Claims, 6 Drawing Sheets

COLLABORATIVE SHARING OF LOCATION INFORMATION AMONG DEVICES IN A NETWORK

CROSS-REFERENCE TO RELATED APPLICATIONS/INCORPORATION BY REFERENCE

This application makes reference to, claims priority to, and claims the benefit of U.S. Provisional Application Ser. No. 61/303,975, filed on Feb. 12, 2010, which is incorporated herein by reference in its entirety.

This patent application makes reference to:
U.S. Provisional Patent Application Ser. No. 61/304,947 which was filed on Feb. 16, 2010;
U.S. patent application Ser. No. 12/732,874 which was filed on Mar. 26, 2010;
U.S. Provisional Patent Application Ser. No. 61/304,100 which was filed on Feb. 12, 2010;
U.S. patent application Ser. No. 12/748,142 which was filed on Mar. 26, 2010;
U.S. Provisional Patent Application Ser. No. 61/304,114 which was filed on Feb. 12, 2010;
U.S. patent application Ser. No. 12/729,184 which was filed on Mar. 22, 2010;
U.S. Provisional Patent Application Ser. No. 61/304,168 which was filed on Feb. 12, 2010;
U.S. patent application Ser. No. 12/732,913 which, was filed on Mar. 26, 2010;
U.S. Provisional Patent Application Ser. No. 61/304,128 which was filed on Feb. 12, 2010;
U.S. patent application Ser. No. 12/748,159 which was filed on Mar. 26, 2010;
U.S. Provisional Patent Application Ser. No. 61/311,879 which was filed on Mar. 9, 2010;
U.S. patent application Ser. No. 12/732,922 which was filed on Mar. 26, 2010;
United States Provisional Patent Application Ser. No. 61/304,193 which was filed on Feb. 12, 2010;
U.S. patent application Ser. No. 12/729,197 which was filed on Mar. 22, 2010;
U.S. Provisional Patent Application Ser. No. 61/304,205 which was filed on Feb. 12, 2010;
U.S. patent application Ser. No. 12/748,177 which was filed on Mar. 26, 2010;
U.S. Provisional Patent Application Ser. No. 61/312,970 which was filed on Mar. 11, 2010;
U.S. patent application Ser. No. 12/732.973 which was filed on Mar. 26, 2010;
U.S. Provisional Patent Application Ser. No. 61/304,198 which was filed on Feb. 12, 2010;
U.S. patent application Ser. No. 12/732,940 which was filed on Mar. 26, 2010;
U.S. Provisional Patent Application Ser. No. 61/304,210 which was filed on Feb. 12, 2010;
U.S. patent application Ser. No. 12/748,194 which was filed on Mar. 26, 2010;
U.S. Provisional Patent Application Ser. No. 61/306,387 which was filed on Feb. 19, 2010;
U.S. patent application Ser. No. 12/748,212 which was filed on Mar. 26, 2010;
U.S. Provisional Patent Application Ser. No. 61/305,174 which was filed on Feb. 17, 2010;
U.S. patent application Ser. No. 12/732.986 which was filed on Mar. 26, 2010;
U.S. Provisional Patent Application Ser. No. 61/314,521 which was filed on Mar. 16, 2010;
U.S. patent application Ser. No. 12/748,016 which was filed on Mar. 26, 2010;
U.S. Provisional Patent Application Ser. No. 61/304,240 which was filed on Feb. 12, 2010;
U.S. patent application Ser. No. 12/722,408 which was filed on Mar. 11, 2010;
U.S. Provisional Patent Application Ser. No. 61/304,253 which was filed on Feb. 12, 2010;
U.S. patent application Ser. No. 12/748,240 which was filed on Mar. 26, 2010;
U.S. Provisional Patent Application Ser. No. 61/306,639 which was filed on Feb. 22, 2010;
U.S. patent application Ser. No. 12/748,010 which was filed on Mar. 26, 2010.

Each of the above stated applications is hereby incorporated herein by reference in its entirety.

FIELD OF THE INVENTION

Certain embodiments of the invention relate to wired communication systems. More specifically, certain embodiments of the invention relate to collaborative sharing of location information among devices in a network.

BACKGROUND OF THE INVENTION

Location-based services (LBS) are emerging as a new type of value-added service provided by mobile communication network. LBS are mobile services in which the user location information is used in order to enable various LBS applications such as, for example, enhanced 911 (E-911), location-based 411, location-based messaging and/or location-based friend finding services. A location of a mobile device may be determined in different ways such as, for example, using network-based technology, using terminal-based technology, and/or hybrid technology, which is a combination of the former technologies. Many positioning technologies such as, for example, Time of Arrival (TOA), Observed Time Difference of Arrival (OTDOA), Enhanced Observed Time Difference (E-OTD) as well as the Global navigation satellite-based systems (GNSS) such as Global Positioning System (GPS), Global Navigation Satellite System (GLONASS), Galileo, and/or Assisted-GNSS (A-GNSS), may be utilized to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for collaborative sharing of location information among devices in a network.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for collaborative sharing of location information among devices in a network. A wireless communication device, for example, a mobile handheld device or a stationary network device may communicate a location to one or more other communication devices. The wireless communication device may be operable to detect when the one or more other communication devices is seeking location information by utilizing one or more of a nonstandard communication protocol, a standard communication protocol and a proprietary communication protocol. The nonstandard, the standard and/or the proprietary communication protocol may be utilized during communication that is implemented based on a different communication protocol, for example, a protocol utilized in one or more of Bluetooth, RFID, IEEE 802.11 and/or cellular phone communication. The location may be determined utilizing a GNSS receiver within the wireless communication device and/or by utilizing information received from a network device, for example. Furthermore, the communicated location may be determined based on, one or more of, a location that is determined for the wireless communication device, a relative distance between the wireless communication device and one or more of the other communication devices and a relative direction from the wireless communication device to one or more of the other communication devices. The communicated location may be communicated by the one or more other communication devices to one or more devices via a network. The wireless communication device may receive locations and/or uncertainties corresponding to respective locations, from one or more other location aware wireless communication devices that may be located within a limited range from the wireless communication device. A new location may be determined, based on the received locations, the corresponding uncertainties and the location that is determined for the wireless communication device. The new location may be more accurate than the location determined for the wireless communication device. The new location may be communicated to one or more of the other location aware wireless communication devices and/or to one or more of the other communication devices.

Figure 1:
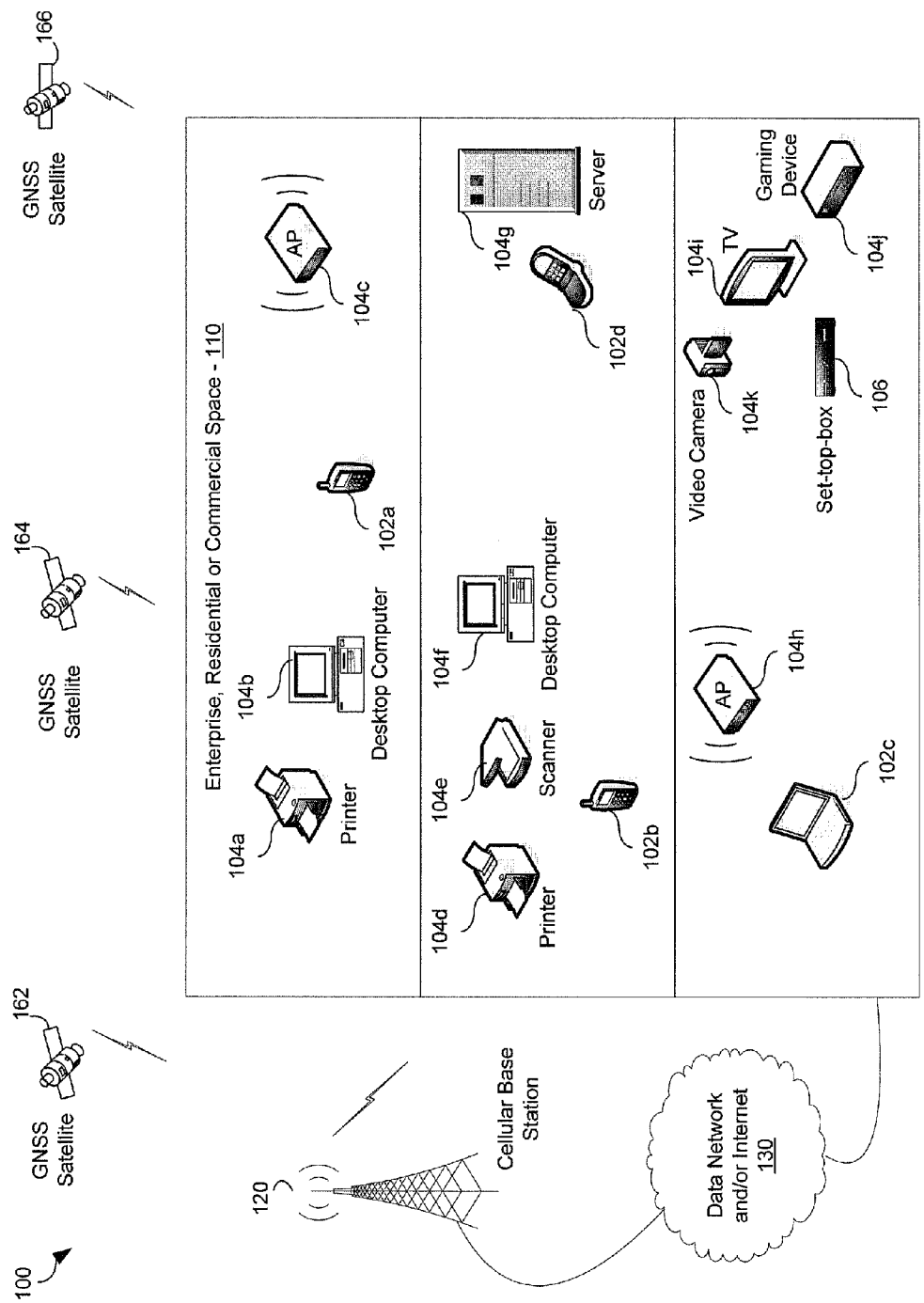
FIG. 1 is a diagram illustrating an exemplary communication system that is operable to share location information among a plurality of communication devices, in accordance with an embodiment of the invention.

FIG. 1 is a diagram illustrating an exemplary communication system that is operable to share location information among a plurality of communication devices, in accordance with an embodiment of the invention. Referring to FIG. 1, there is shown a communication system 100 and a building 110. The communication system 100 comprises a plurality of location aware mobile devices 102a, 102b, 102c and 102d which are collectively referred to as the location aware mobile devices 102, and a location aware stationary device 106. Also shown are a plurality of location unaware devices comprising 104a, 104b, 104c, 104d, 104e, 104f, 104g, 104h, 104i, 104j and 104k which are collectively referred to as location unaware devices 104. In addition, a cellular base station 120, a data network 130, a plurality of GNSS satellites, of which GNSS satellites 162, 164 and 166 are illustrated.

The building 110 may comprise any suitable structure that may comprise one or more mobile or stationary communication devices. For example, the building 110 may comprise an enterprise, residential and/or commercial space. The invention is not limited to an indoor space and may be utilized in any suitable indoor and/or outdoor location and/or a vehicle.

The plurality of location aware mobile devices 102 may comprise suitable logic, circuitry, interfaces and/or code that may be operable to communicate based on one or more of a variety of wireless and/or wired communication protocols. The plurality of location aware mobile devices 102 may each comprise a plurality of radio interfaces. For example, the plurality of location aware mobile devices 102 may be operable to communicate with one or more of a satellite network, for example, a GNSS network, a wide area network, for example, a cellular network, a local area network, for example, a WiFi network or WLAN and/or a personal area network, for example, via a Bluetooth connection. Exemplary location aware mobile devices 102 may comprise a mobile phone, a laptop, a media player, a gaming device, a medical device and/or a location determination device although the invention is not limited in this regard. Each of the plurality of location aware devices 102 may be operable to determine its location and/or to update its location and/or may be in possession of its current location.

One or more of the plurality of location aware mobile devices 102 may be operable to communicate via a wide area network, for example, via the cellular base station 120, utilizing voice and/or data communication. Moreover, one or more of the plurality of location aware mobile devices 102 may be operable to communicate via a local area network based on, for example, IEEE 802.11 standards and/or variations thereof. In this regard, the location aware mobile devices 102 may be operable to communicate via the wireless access points 104c and/or 104h. Furthermore, one or more of the plurality of location aware mobile devices 102 may be operable to communicate with devices that are located within a limited range, for example, in a personal area network based on Bluetooth protocols. In this regard, one or more of the plurality of mobile devices 102 may be operable to communicate directly with each other, with the location aware device 106 and/or with the location unaware devices 104.

One or more of the location aware mobile devices 102 may be operable to determine its location based on one or more of a variety of methods. For example, the communication devices may be operable to determine their location autonomously, with assistance data from a network device and/or may receive their location from one or more network devices, for example, from a cellular base station or an access point. One or more of the plurality of location aware mobile devices 102 may comprise a GNSS receiver and may be operable to determine its location utilizing GNSS satellite system data, for example, from the GNSS satellites 162, 164 and/or 166. Each of the location aware mobile devices 102 may be operable to utilize GNSS satellite data to determine its location autonomously and/or with assistance from a location server and/or a satellite reference network (SRN) (not shown). The location server and/or SRN may be communicatively coupled to the location aware mobile devices 102 via the cellular base station 120 and/or via the data network 130. In various embodiments of the invention, other network elements, for example, the location aware stationary device 106 may be operable to provide location information to one or more of the location aware mobile devices and/or to the location unaware devices 104.

One or more of the location aware mobile devices 102, for example, 102a may comprise suitable logic, circuitry, interfaces and/or code that may be operable to receive satellite broadcast signals from one or more GNSS satellites that may be located within view. For example, the GNSS satellites 162, 164 and/or 166 may be in view of the location aware mobile device 102a. The location aware mobile device 102a may take various GNSS measurements such as pseudorange and/or carrier phase of GNSS signals to calculate navigation information such as GNSS position of the location aware mobile device 102a, for example. In some instances, the location aware mobile device 102a may receive GNSS assistance information that may enable the location aware mobile device 102a to determine its location more quickly and/or more accurately.

In various exemplary embodiments of the invention, one or more of the location aware mobile device 102 may be operable to communicate its location to one or more other devices, for example, to one or more of the location unaware devices 104. For example, the location aware mobile device 102b may be placed in close proximity to the location unaware devices 104d, 104e and 104f and may be operable to communicate with the location unaware devices based on, for example, Bluetooth and/or 802.11 communication protocols. The location aware mobile device 102b may comprise a GNSS receiver and may determine its location while it is in close proximity to the location unaware devices 104d, 104e and 104f. The location aware mobile device 102b may broadcast its location and/or may establish a Bluetooth connection with one or more of the location unaware devices 104d, 104e and 104f and may communicate its location to the devices.

The plurality of location unaware devices 104 may comprise suitable logic, circuitry, interfaces and/or code that may be operable to communicate based on one or more wireless and/or wired communication protocols and may comprise one or more radio interfaces. For example, the plurality of location unaware devices 104 may be operable to communicate with one or more of a satellite network, for example, a satellite television network, a wide area network, for example, an Ethernet network or a cellular network, a local area network, for example, a LAN, WLAN and/or WiFi network and/or a personal area network, for example, via a Bluetooth connection. Exemplary location unaware devices 104 may comprise a desktop computer, a printer, a scanner, a wireless access point, a server, a television, a gaming device, a telephone and a medical device although the invention is not limited in this regard. For example, the location unaware devices 104c and 104h may comprise wireless access points, 104b and 104f may comprise desktop computers, 104a and 104d may comprise printers and 104e may comprise a scanner. Moreover, the location unaware devices 104g, 104i, 104j and 104k may comprise a server, a television, a gaming console and a video camera respectively. The location unaware devices 104 may be mobile or stationary. Any portable or handheld device may be referred to as a mobile device.

In various embodiments of the invention, the plurality of location unaware devices 104 may be operable to communicate with each other and/or the location aware mobile devices 102, for example, in a mesh network and/or via a network such as an 802.11 network. For example, a location unaware device 104f that may be referred to as the desktop computer 104f, may receive location information from the location aware mobile device 102b. The desktop computer 104f may forward the location information to the location unaware device 104g which may be referred to as the maintenance server 104g, via a network. Although the plurality of location unaware devices 104 are shown as stationary devices within an interior space, the invention is not so limited. For example, one or more of the plurality of location unaware devices 104 may be located outside and/or in a vehicle and may not be stationary.

The location aware stationary device 106 may comprise a set-top-box and may be referred to as the set-top-box 106. The set-top-box 106 may comprise suitable logic, circuitry, interfaces and/or code that may be operable to obtain its location based on various methods, for example, it may determine its own location and/or may receive location information from another device. The set-top-box 106 may be operable to store its location and/or may communicate its location to another device. For example, the set-top-box 106 may comprise a GNSS receiver and may be operable to determine its location based on GNSS data. Furthermore, the set-top-box may be operable to receive its location via a network connection, for example, from a head-end device. In one exemplary embodiment of the invention, billing information that may be known by a service provider may indicate a geographic location of the set-top-box 106. The geographic location may be communicated from the head-end to the set-top-box 106. Alternatively, the set-top-box 106 may be operable to receive input from a user or technician that may configure location information into the set-top-box 106. In various embodiments of the invention, the set-top-box may receive its location from a mobile device that may be located nearby the set-top-box 106, for example, via a Bluetooth connection. In this manner, the set-top-box 106 may become aware of its location.

In an exemplary embodiment of the invention, the location aware stationary set-top-box 106 may send its location information to another device. For example, when a mobile device comes within communication range of the set-top-box 106, the set-top-box 106 may send the location to the mobile device. The set-top-box 106 may also communicate location information to another stationary device. For example, location information may be shared among the set-top-box 106 and one or more other devices that may be located within communication range of the set-top-box 106, for example, via a Bluetooth connection or via a WLAN and/or a LAN connection. In this regard, the set-top-box 106 may share location information with the location unaware devices 104k, 104i and 104j, which may comprise a video camera, a television and a gaming console respectively.

The GNSS satellites 162, 164 and/or 166 may comprise suitable logic, circuitry, interfaces and/or code that may be operable to generate and/or broadcast satellite navigational information. The broadcast satellite navigational information may be retrieved and utilized by one or more of the location aware devices 102 to calculate their location and/or to determine time. Satellite navigational information may be also be received by a terrestrial Satellite reference network (SRN) (not shown) and it may be communicated via a network to the location aware mobile devices 102. The location aware mobile devices 102 may be operable to utilize the SRN information to enhance and/or assist in determining their location. The GNSS satellites 162, 164 and/or 166 may comprise GPS, Galileo, and/or GLONASS satellites.

A cellular base station such as the cellular base station 120 may comprise suitable logic, circuitry, interfaces and/or code that may be operable to manage and schedule communication resources in an uplink direction and/or downlink direction to various mobile devices such as the location aware mobile devices 102 and/or one or more location unaware devices 104, for example. The cellular base station 120 may be operable to communicate via radio frequency signals with the location aware mobile devices 102 using air interface protocols that may be specified for CDMA, GSM, UMTS, WIMAX and/or LTE radio access, for example. The cellular base station 120 may be operable to support location determination for one or more of the location aware mobile devices 102 and may provide the devices with location assistance data or with a network determined location, for example.

The data network 130 may comprise suitable devices, circuitry, interfaces and/or code that are operable to support data communication among one or more of the location aware mobile devices 102, one or more of the location unaware devices 104, the set-top-box 106 and other devices that may be coupled to the data network 130. The data network 130 may be communicatively coupled with one or more of the cellular base station 120, the location aware mobile devices 102, the location unaware devices 104 and/or the set-top-box 106. The data network 130 may comprise a single network and/or may comprise one or more interconnected networks. For example, the data network 130 may comprise a private network such as an enterprise or residential network and/or may comprise the Internet. The data network 130 may also comprise a portion of a mobile core network that may be communicatively coupled to the cellular base station 130, for example, via a base station controller. In various embodiments of the invention, the data network 130 may support communication based on the Internet Protocol Suite of standards.

In an exemplary operation, the location aware mobile device 102*a* may be operable to determine its location utilizing the GNSS satellites 162, 164 and 166. The location aware mobile device 102*a* may be operable to update its location periodically or aperiodically as it moves to various locations. For example, the location aware mobile device 102*a* may comprise a mobile phone that may be referred to as the mobile phone 102*a*. The mobile phone 102*a* may be carried by a user within an office building, for example. The user may move to a location that is in close proximity to the location unaware device 104*a* which may be referred to as the printer 104*a*. The mobile phone 102*a* may broadcast its location or may establish a connection, for example, a Bluetooth connection, with the printer 104*a*. The mobile phone 102*a* may communicate its current location to the printer 104*a* via the Bluetooth connection. In various exemplary embodiments of the invention, once the printer 104*a* and/or other location unaware devices 104 within the office building, receive their location information, they may report their location to a maintenance server, for example, the server 104*g*, via a LAN or via a wireless LAN, for system administration purposes.

In various embodiments of the invention, a location of a location aware mobile device 102 may be utilized and/or may be adjusted to reflect a more accurate location for a location unaware device 104. In this regard, a location aware mobile device 102 and/or location unaware device 104 may be operable to determine or estimate a relative distance between the two devices and/or a relative direction from one device to the other. Any suitable method for determining relative distance and/or relative direction may be utilized. For example, various signaling techniques such as round trip delay and/or synchronized clocks may enable estimation of a relative distance from one device to another. A relative direction may be determined utilizing one or more of directional antennas, direction adaptive antennas, antenna arrays, a sensor such as a compass, and/or a plurality of base stations may aid in determining direction and/or spatial orientation. Furthermore, user input may be utilized to determine relative distance and/or a relative direction. Once a relative distance and/or a relative direction are known, a new, more accurate location may be determined for the location unaware device 104. For example, any of the location aware devices 102, the set-top-box 106 and/or the location unaware devices 104 may be operable to determine the new, more accurate location for the location unaware device 104, utilizing the location of the location aware device 102, the relative distance and/or the relative direction information. Furthermore, the location of the location aware device 102, the relative distance and/or the relative direction information may be communicated to a network device, for example, the cellular base station 120 or a device in the data network 130 for determination of the new, more accurate location. Notwithstanding, the invention is not limited to any specific method for determining a device location, and any suitable method may be utilized.

In another exemplary operation, the location aware mobile devices 102*a*, 102*b*, 102*c* and 102*d* may be located within close proximity. For example, their proximity may be such that they are able to communicate with each other within the limited range of a personal area network, for example, via a Bluetooth connection. Alternatively, their proximity may be such that they are able to communicate with each other via one or more other devices such as the wireless access point 104*h* that may be operable to provide service within a limited range. In addition, each of the location aware devices 102*a*, 102*b*, 102*c* and 102*d* may be operable to determine their respective locations utilizing information received from the GNSS satellites 162, 164 and/or 166 and/or from one or more cellular base stations such as the cellular base station 120, for example. The determined locations may comprise various errors and/or uncertainties that may be increased, for example, due to a lower number of GNSS satellites in view, weak or blocked signals and/or noise and interference in the GNSS and/or cellular signals. Furthermore, the location error and/or uncertainty may depend on the quality of the GNSS receiver and/or method of position determination.

The location aware mobile devices 102 may communicate their respective locations to each other via Bluetooth connections, for example. Based on a communication range of Bluetooth connections, the distance between the mobile devices 102 may be limited. For example, it may be determined that the maximum distance between the location aware mobile devices 102 is about 30 feet. Notwithstanding, their respective determined locations may vary by over 600 feet, for example. One or more of the location aware mobile devices 102 may analyze the plurality of shared locations and/or their limited proximity and may determine a new, more accurate location for the location aware mobile devices 102. The new, more accurate location may be reported back to the location aware mobile devices 102 or to another device, for example. In various embodiments of the invention, the respective determined locations of the location aware mobile devices 102 and/or their limited proximity data may be reported to another device, for example, in the building 110 and/or via the cellular base station 120 and/or the data network 130. A local or a remote device may perform an analysis of the communicated location and/or proximity data and may determine a new, more accurate location for the location aware mobile devices 102. The local or remote device may report the new, more accurate location to the location aware mobile devices 102.

Figure 2A:
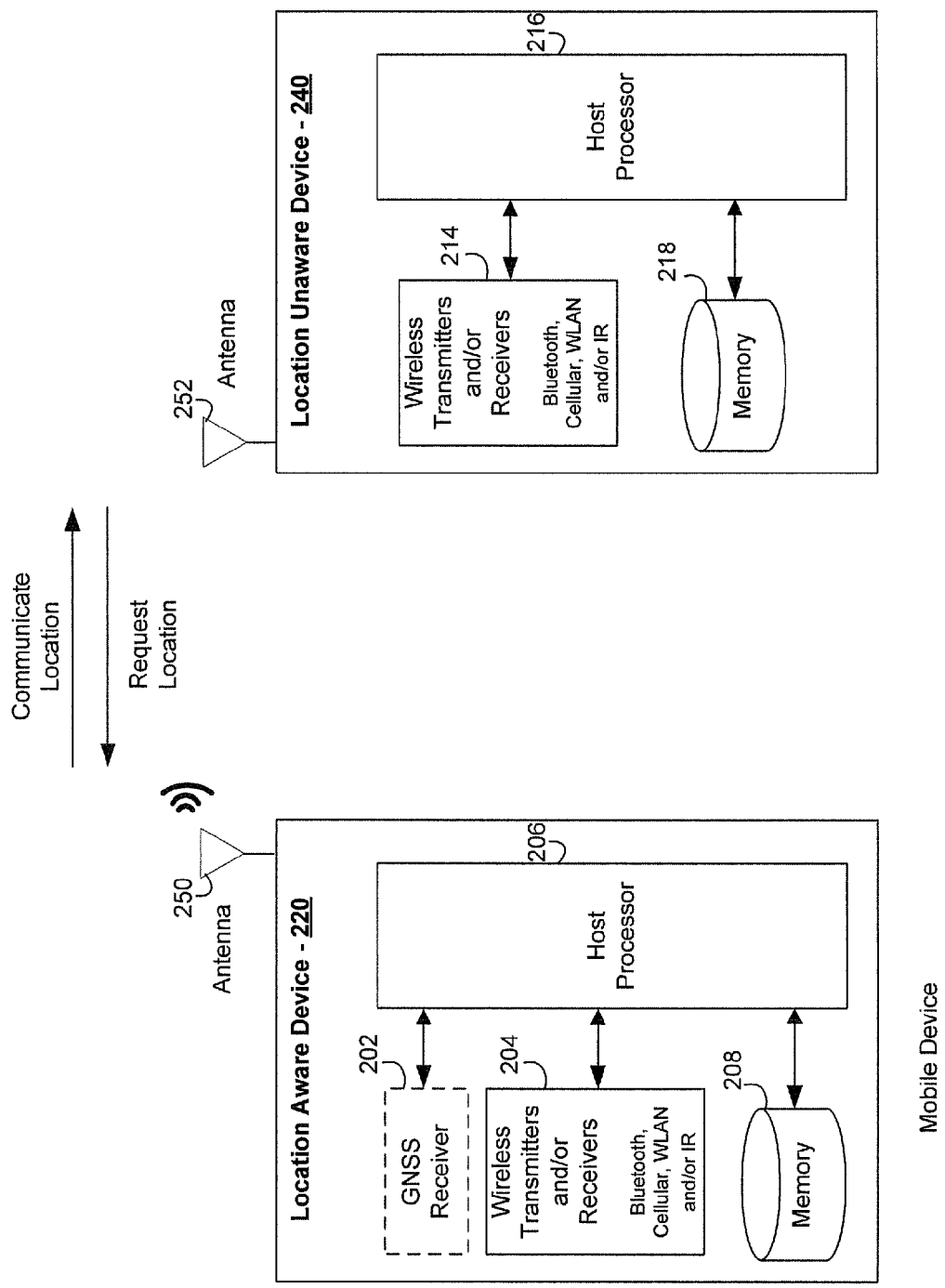
FIG. 2A is a block diagram illustrating an exemplary location aware mobile device that is operable to communicate a location to a location unaware device, in accordance with an embodiment of the invention.

FIG. 2A is a block diagram illustrating an exemplary location aware mobile device that is operable to communicate a location to a location unaware device, in accordance with an embodiment of the invention. Referring to FIG. 2A, there is shown a location aware device 220 and a location unaware mobile device 240. The location aware device 220 may comprise an optional GNSS receiver 202, one or more wireless transceivers 204, one or more antennas 250, a host processor 206 and a memory 208. The location unaware device 240 may comprise one or more wireless transceivers 214, one or more antennas 250 a host processor 216 and a memory 218.

The location aware device 220 may be similar and/or substantially the same as one or more of the location aware mobile device 102 and/or as the location aware stationary device 106. The location aware device 220 may be a mobile or stationary device. The location aware device 220 may comprise a GNSS receiver and may be operable to determine its location autonomously and/or with assistance from a network device, for example, a location based services (LBS) server (not shown). Furthermore, the location of the location aware device 220 may be determined by devices within a network, for example, a cellular network and may be communicated to the location aware device 220 via the cellular base station 120, for example.

The optional GNSS receiver 202 may comprise suitable logic, circuitry, interfaces and/or code that may be operable to detect and receive GNSS signals from a plurality of visible GNSS satellites such as the GNSS satellites 162, 164 and/or 166. The GNSS receiver 202 may be operable to utilize the received GNSS signals to calculate location information such as a GNSS position of the GNSS receiver 202 and/or to determine a time, for example. In various embodiments of the invention, the GNSS receiver may utilize information from a location based server (not shown) for assisted and/or enhanced GNSS location determination. The location and/or time information may be provided to the host processor 206 and/or may be stored in the memory 208.

One or more wireless transceivers 204 may comprise suitable logic, circuitry, interfaces and/or code that may be operable to communicate based on one or more radio access protocols, for example, CDMA, GSM, UMTS, LTE, WiMAX, WiFi, Bluetooth, RFID and/or Zigbee, although the invention is not limited in this regard. For example, one or more of the wireless transceivers 204 may be operable to communicate with the cellular base station 120 and/or with the wireless access point 110. Furthermore, one or more of the wireless transceivers 204 may be operable to communicate with a local communication device such as the location unaware device 240, a mobile phone, a laptop, a desk top computer, a printer, a scanner, a television, a video camera or a set-top-box. For example, one or more of the transceivers 204 may be operable to communicate with one or more of the wireless transceivers 214 based on one or more of a plurality of communication protocols such as Bluetooth, RFID, WiFi and cellular protocols, for example. Moreover, one or more of the wireless transceivers 204 may be operable to communicate with one or more of the wireless transceivers 214 based on a standard, a non-standard and/or a proprietary protocol that may be utilized for communicating requests for location information and/or for communicating location information among local devices. In various embodiments of the invention, the requests for location information and/or location information may be communicated based on a communication protocol that is nested, layered and/or interleaved with another communication protocol that may be utilized in a connection between devices such as between the location aware device 220 and the location unaware mobile device 240.

The one or more antennas 250 may comprise suitable logic, circuitry, interfaces and/or code that may be operable to transmit and/or receive signals to and/or from one or more wireless devices and/or network devices. For example, one or more of the antennas 250 may be configured to communicate with one or more of the cellular base station 120, the wireless access points 104*c* and/or 104*h*, the GNSS satellites 162, 164 and 166, the location aware devices 102 and/or the location unaware devices 104. In various embodiments of the invention, one or more of the antennas 250 may comprise directional antennas, antenna arrays and/or smart antennas, for example, that may be operable to configure antenna azimuth and/or may be operable to determine a direction from which a signal is received. Other information may assist in determining direction of a signal source, for example, information from a compass (not shown) and/or from one or more base stations such as the cellular base station 120 and/or the access points 104*c* and/or 104*h*.

The host processor 206 may comprise suitable logic, circuitry, interfaces and/or code that may be operable to manage and/or control operations of the location aware device 220 components such as the GNSS receiver 202, the one or more wireless transceivers 204 and/or the one or more antennas 250. For example, the host processor 206 may request that the GNSS receiver 202, determine a location for the location aware device 220. The host processor 206 may be operable to activate and/or deactivate one or more associated radios such as one or more of the wireless transceivers 204 as needed for communicating location information, for example. In various embodiments of the invention, the host processor 206 may be operable to retrieve location information for the location aware device 220 from a network device, such as the cellular base station 120, and may store the location information in the memory 208. In addition, the host processor 206 may be operable to establish a connection between the location aware device 220 and the location unaware device 240, for example, a Bluetooth connection. The host processor 206 may be operable to retrieve the location information from the memory 204 and/or from the GNSS receiver 202 and may communicate the location information to the location unaware device 240 via the established connection.

The host processor 206 may comprise suitable logic, circuitry, interfaces and/or code that may be operable to determine the relative distance and/or relative direction of another device, for example, of the location unaware device 240. For example, signaling techniques such as clock synchronization and/or round trip delay of signals may be utilized to determine a relative distance of the location unaware device 240 from the location aware device 220. The relative direction of the location unaware device 240 from the location aware device 220 may be determined, for example, utilizing antenna azimuth and/or sensor information such as from a compass (not shown). In addition, the host processor 206 may utilize information from other network devices, for example, from one or more cellular base stations such as the base station 120 and/or from one or more access points, that may assist in spatially orienting the location aware device 220. In various embodiments of the invention, the host 206 may be operable to determine a new location for the location unaware device 240 based on a location determined for the location aware device 220 and the relative distance and/or relative direction of the location unaware device 240. The host processor 206 may be operable to establish a connection with the location unaware device 240 and may communicate one or more of the newly determined location, the relative distance and/or the relative direction to the location unaware device 240. Alternatively, the location aware device 220 may communicate, to a device in the data network 130, one or more of its location information, the relative distance and/or the relative direction to the location unaware device 240.

The memory 208 may comprise suitable logic, circuitry, interfaces and/or code that may be operable to store information such as executable instructions and data that may be utilized by the host processor 206 and/or other device components such as, for example, the GNSS receiver 202, one or more of the wireless transceivers 204 and/or one or more of the antennas 250. The memory 208 may comprise storage for location information, relative distance, relative direction and/or for time information, for example. The memory 208 may comprise RAM, ROM, low latency nonvolatile memory such as flash memory and/or other suitable electronic data storage.

The location unaware device 240 may be similar and/or substantially the same as one or more of the location unaware mobile device 104. The location unaware device 240 may comprise a stationary and/or a mobile device. The location unaware device 240 may be operable to receive location information from the location aware device 220.

The one or more wireless transceivers 214, the memory 218 and/or the one or more antennas 252 may be similar and/or substantially the same as the one or more wireless transceivers 204, the memory 208 and/or the one or more antennas 250 in the location aware device 220. One or more of the wireless transceivers 214 may be operable to communicate with the wireless transceiver 204.

The host processor 216 may comprise suitable logic, circuitry, interfaces and/or code that may be operable to manage and/or control operations of the location unaware device 240 components such as the one or more wireless transceivers 214 and/or the one or more antennas 252. For example, the host processor 216 may be operable to activate and/or deactivate one or more associated radios such as one or more of the wireless transceivers 214 as needed for communication. In addition, the host processor 206 may be operable to establish a connection between the location aware device 220 and the location unaware devices 240, for example, a Bluetooth connection. The host processor 216 may be operable to communicate with the location aware device and may be operable to request location information and/or help to determine relative distance and/or relative direction from the location aware device 220.

In operation, the location aware device 220 and the location unaware device 240 may be located within communication range, for example, within range to establish a Bluetooth connection, an RFID connection or a WiFi connection. The location aware device 220 and the location unaware device 240 may be operable to establish a connection, for example, based on Bluetooth, RFID or WiFi specifications. The location unaware device 240 may request location information from the location aware device 220. In this regard, the location unaware device 240 may be operable to communicate the request based on a standard, a non-standard and/or a proprietary communication protocol that may be utilized for communicating requests for location information and/or for communicating location information among local devices. In various embodiments of the invention, the protocol that may be utilized for communicating location requests and/or for communicating location information, may be nested, layered and/or interleaved within another communication protocol. For example, within the Bluetooth, RFID or WiFi protocols that may be utilized for communication by the location aware device 220 and the location unaware mobile device 240. For example, the location unaware device 240 may establish a Bluetooth radio link to the location aware device 220. The location unaware mobile device 240 may indicate that it is seeking information about its location, to the location aware device 220. The location unaware device 240 may set a flag in a header or may encapsulate a location request within a packet that may be formatted in accordance with Bluetooth specifications, for example. Moreover, in various embodiments of the invention, the location aware device 220 may communicate its location to the location unaware device 240 in a similar manner, by encapsulating location information within a packet that is formatted in accordance with Bluetooth specifications. Notwithstanding, the invention is not limited in this regard and any suitable communication protocol may be utilized to request location information and/or to distribute location information. Alternatively, the location aware device 220 may be operable to broadcast its location without establishing a two way radio link. Any other local devices, such as the location unaware device 240 may be operable to receive the location information via the broadcast. Once the location unaware device 240 learns of its location from the location aware device 220, it may communicate the location information to one or more other local devices, for example, via a wired or wireless communication link. In this manner, location information may propagate via a plurality of local devices that may be unable to determine their own location or may be operable to verify or improve location information that they may have.

The location aware device 220 may be operable to determine its location utilizing the GNSS receiver 202 and/or may retrieve its location from the memory 204. The location aware device 202 may communicate its location to the location unaware device 240. In various embodiments of the invention, the location aware device 220 may determine a relative distance and/or a relative direction from the location unaware device 240. The location aware device 202 may determine a new, more accurate location for the location unaware device 240 and may communicate the new location information to the location unaware device 240. In various embodiments of the invention, the location unaware device 240 may communicate location to another device via a network, for example, to a maintenance server. In this manner, an enterprise network may automatically maintain locations for a plurality of network devices. The invention is not limited to any specific method for determining a device location, and any suitable method may be utilized.

Figure 2B:
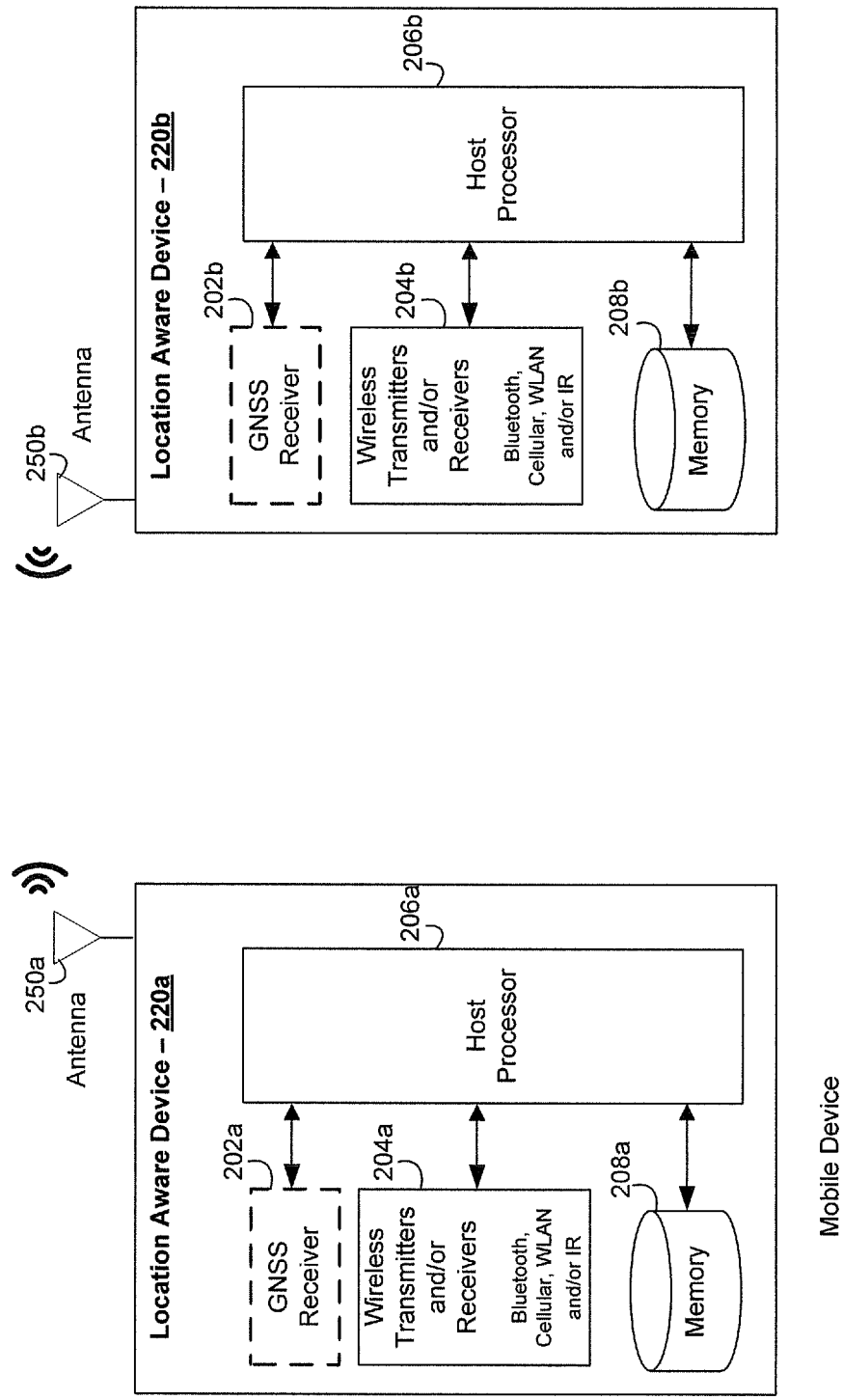
FIG. 2B is a block diagram illustrating a plurality of exemplary location aware devices located within a limited range that are operable to refine their location based on a plurality of their respective locations, in accordance with an embodiment of the invention.

FIG. 2B is a block diagram illustrating a plurality of exemplary location aware devices located within a limited range that are operable to refine their location based on a plurality of their respective locations, in accordance with an embodiment of the invention. Referring to FIG. 2B, there is shown two location aware devices 220a and 220b. The location aware devices 220A may comprise the optional GNSS receiver 202a, one or more wireless transceivers 204a, one or more antennas 250a, a host processor 206a and a memory 208a. The location aware device 220b may comprise an optional GNSS receiver 202b, one or more wireless transceivers 204b, one or more antennas 250b, a host processor 206b and a memory 208b.

The location aware devices 220a and 220b may be similar and/or the substantially the same as the location aware device 220 described with respect to FIG. 2A.

In operation, one or both of the location aware devices 220a and 220b may be operable to communicate their location information, for example, to each other and/or to one or more other location aware devices within a limited range. One or both of the location aware devices 220a and 220b may be operable to receive location information, for example, from each other and/or from one or more other location aware devices within a limited range. One or both of the location aware devices 220a and/or 220b may be operable to determine a new, more accurate location for the location aware devices 220a, 220b and/or the other location aware devices based on a plurality of received locations for the other respective location aware devices. In this regard, additional information, for example, the relative distance between the location aware devices and/or relative direction may be utilized to determine the new location. In various embodiments of the invention, the location aware devices 220a, 220b and/or any other location aware device that may be within communication range, may communicate based on a limited range communication interface, for example, a Bluetooth interface. The location aware devices may utilize knowledge of their limited proximity to assist in determining the new, more accurate location.

Figure 3:
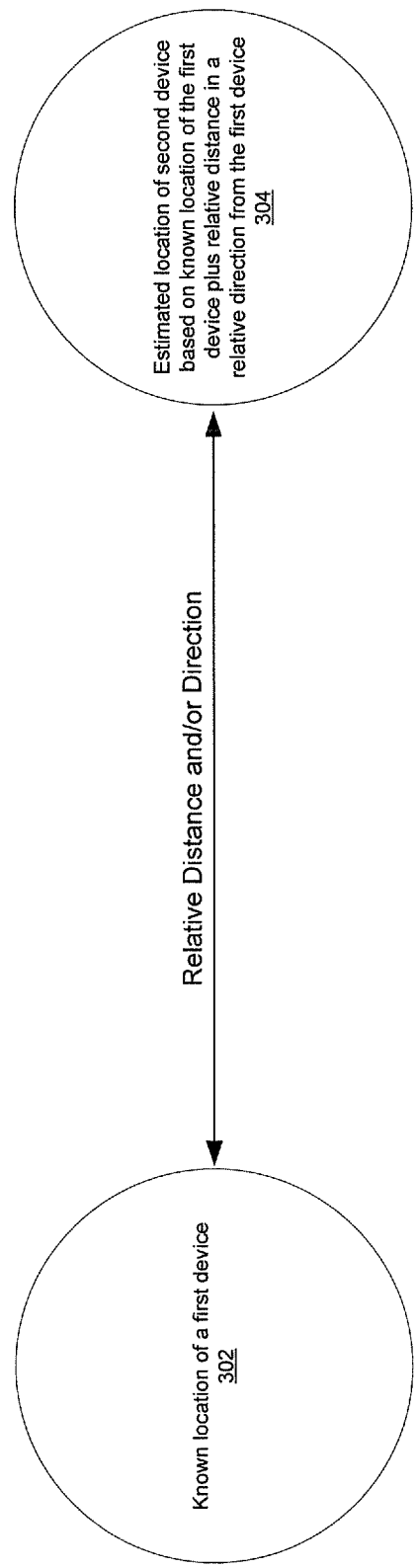
FIG. 3 is a block diagram illustrating an exemplary communication device that is operable to determine a location of a second communication device based on a relative distance and/or relative location, in accordance with an embodiment of the invention.

FIG. 3 is a block diagram illustrating an exemplary communication device that is operable to determine a location of a second communication device based on a relative distance and/or relative location, in accordance with an embodiment of the invention. Referring to FIG. 3, there is shown a first device 302 and a second device 304.

The first device 302 may be similar and/or substantially the same as one of the location aware mobile devices 102 and/or as the location aware device 220. The second device 304 may be similar and/or substantially the same as one of the location unaware devices 104 and/or as the location unaware device 240.

In operation, the first device 302 may be operable to determine its location. The first device 302 and the second device 304 may establish a connection, for example, a Bluetooth connection. The second device 304 may request location information from the first device 302. The first device 302 may determine a relative direction to the second device 304. The relative direction may be determined based on signaling between the first device 302 and the second device 304 and/or from an internal sensor, such as a compass. Moreover, a plurality of base stations such as the cellular base station 120 may exchange signals with the first device 302 to determine its orientation in space. The first device 302 may utilize its orientation and/or its own directional antennas to determine the relative direction of the second device 304. Furthermore, the first device 302 may determine a relative distance from the second device 304. The first device 302 may send a signal to the second device 304 and may measure the time it takes for the second device 304 to return a corresponding signal. The second device 304 may provide the first device 302 with its internal delay time. The first device 302 may determine a new location for the second device 304 utilizing the location of the first device 302, the relative direction and/or the relative distance of the second device 304. The first device 302 may communicate the new location to the second device 304 and/or to another device.

Figure 4:
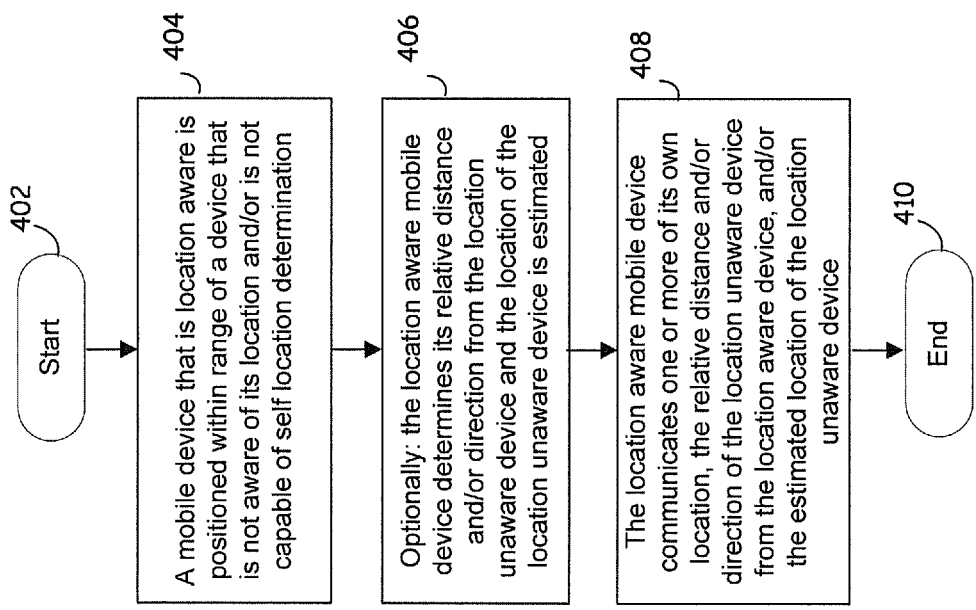
FIG. 4 is a flow chart illustrating exemplary steps for sharing location information among a plurality of communication devices, in accordance with an embodiment of the invention.

FIG. 4 is a flow chart illustrating exemplary steps for sharing location information among a plurality of communication devices, in accordance with an embodiment of the invention. Referring to FIG. 4, the exemplary steps may begin at step 402. In step 404, a mobile device 102a that is aware of its location is positioned within range of another device, for example, the location unaware device 104b, that is not aware of its location and/or may not be capable of self location determination. In step 406, the location aware mobile device 102a may optionally determine its relative distance and/or its relative direction from the location unaware device 104b. The location aware device 102a may optionally estimate a location of the location unaware device 104b based on the location of the location aware device 102a, the relative distance and/or the relative direction of the location unaware device 104b. In step 408, the location aware mobile device 102a may communicate one or more of its own location, the relative distance, the relative direction and/or the estimated location of the location unaware device 104b. The exemplary steps may end at step 410.

Figure 5:
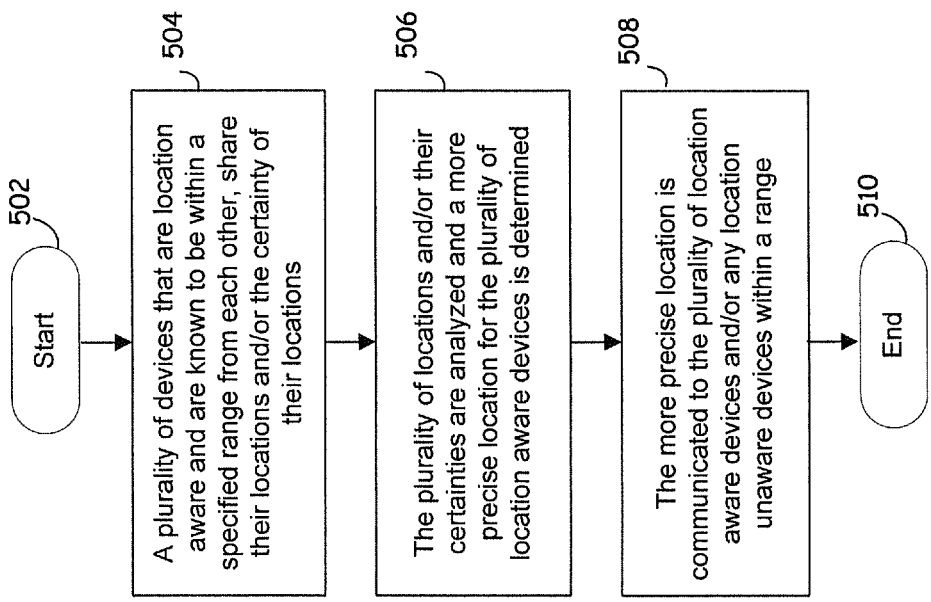
FIG. 5 is a flow chart illustrating exemplary steps for refining accuracy of location for a plurality of communication devices that are located within a limited range, in accordance with an embodiment of the invention.

FIG. 5 is a flow chart illustrating exemplary steps for refining accuracy of location for a plurality of communication devices that are located within a limited range, in accordance with an embodiment of the invention. Referring to FIG. 5, the exemplary steps may begin at step 502. In step 504, a plurality of devices, for example, the location aware mobile devices 102, may share their locations and/or uncertainty values corresponding to their locations. In step 506, the plurality of locations, the uncertainties and/or the proximity of the plurality of location aware devices may be utilized to estimate a more accurate location for the plurality of location aware devices. In step 508, the more accurate location may be communicated to the plurality of location aware devices and/or may be communicated to any location unaware devices within a limited range, for example, the location unaware devices 104. The exemplary steps may end at step 510.

In an embodiment of the invention, a wireless communication device, which may be referred to as the location aware mobile device 102a may communicate a location to one or more other communication devices which may be referred to as the location unaware device 104b. The location aware mobile device 102a may be operable to detect when the one or more other communication devices is seeking location information by utilizing one or more of a nonstandard communication protocol, a standard communication protocol and a proprietary communication protocol. The nonstandard, the standard and/or the proprietary communication protocol may be utilized during communication that is implemented based on a different communication protocol, for example, a protocol utilized in one or more of Bluetooth, RFID, IEEE 802.11 and/or cellular phone communication. The location may be determined utilizing a GNSS receiver, for example, the GNSS receiver 202 described with respect to FIG. 2A, that may be integrated within the wireless communication device such as the location aware mobile device 102a. Moreover, the location may be determined utilizing information received from a network device, for example, from a network device within the data network 130. Furthermore, the communicated location may be determined based on, one or more of, a location that is determined for the wireless communication device, a relative distance between the wireless communication device and one or more of the other communication devices, for example, between the location aware mobile device 102a and the location unaware device 104b, and a relative direction from the wireless communication device to one or more of the other communication devices, for example, a relative direction from the location aware mobile device 102a to the location unaware device 104b. The communicated location may be communicated by one or more of the other communication devices, for example, the location unaware device 104b, to one or more devices via a network, for example, via the data network 130. The wireless communication device, for example, the location aware mobile device 102a, may receive locations and/or uncertainties corresponding to the respective locations, from one or more other location aware wireless communication devices, for example, from the location aware mobile devices 102b and 102c that may be located within a limited range from the wireless communication device. A new location may be determined, based on the received locations from the location aware mobile devices 102b and 102c, the corresponding uncertainties and the location that is determined for the wireless communication device, for example, determined for the location aware mobile device 102a. The new location may be more accurate than the location determined for the wireless communication device. The new location may be communicated to one or more of the other location aware wireless communication devices, for example, to the location aware mobile devices 102b and 102c and/or to one or more of the other communication devices, for example, to one or more of the location unaware mobile devices 104.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for collaborative sharing of location information among devices in a network.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for determining a location of a location unaware device, comprising:
wirelessly transmitting from the location unaware device, a request for location information;
receiving by the location unaware device a location of a location aware device, wherein the wirelessly transmitting and the receiving utilize a first communication protocol that is integrated with a second communication protocol,
wherein the second communication protocol is a Bluetooth protocol, wherein the request for location information is encapsulated in a packet in accordance with the Bluetooth protocol, and wherein the location of the location aware device is encapsulated within a packet formatted in accordance with the Bluetooth protocol;
determining a relative direction from the location aware device to the location unaware device;
determining a relative distance between the location aware device and the location unaware device; and
calculating, within the location unaware device, the location for the location unaware device based on: the received location, the relative direction from the location aware device to the location unaware device, and the relative distance between the location aware device and the location unaware device.

2. The method according to claim 1, wherein the first communication protocol comprises one or more of a non-standard communication protocol, a standard communication protocol and a proprietary communication protocol.

3. The method according to claim 2, the first communication protocol is a different communication protocol than the second communication protocol.

4. The method according to claim 3, wherein the first communication protocol comprises at least one of Radio Frequency Identification (RFID), Institute of Electrical and Electronics Engineers (IEEE) 802.11, or cellular communication protocols.

5. The method according to claim 1, wherein the location of the location aware device is determined based on one or both of utilizing a Global Navigation Satellite-based System (GNSS) receiver within the location aware device and utilizing information from a network device.

6. The method of claim 1, wherein the location unaware device comprises a desktop computer, a printer, a scanner, a wireless access point, a server, a television, a gaming device, a telephone or a medical device.

7. The method of claim 1, wherein the location unaware device is located within an interior space.

8. The method of claim 1, wherein the location unaware device reports the location of the location unaware device to an administrative server.

9. The method of claim 1, wherein determining a relative direction from the location aware device to the location unaware device is based upon signaling exchanged between the location unaware device and the location aware device, an internal sensor within the location unaware device, or a combination thereof.

10. The method of claim 1, wherein determining a relative direction from the location aware device to the location unaware device is based upon calculating a relative orientation of the location unaware device, using directional antennas within the location unaware device, or a combination thereof.

11. The method of claim 1, wherein determining a relative distance between the location aware device and the location unaware device comprises measuring a around trip delay of a signal transmitted between the location unaware device and the location aware device.

12. The method of claim 1, further comprising: receiving a location uncertainty from the location aware device, wherein calculating, within the location unaware device, the location for the location unaware device is based on: the received location, the relative direction from the location aware device to the location unaware device, the relative distance between the location aware device and the location unaware device, and the location uncertainty.

13. The method of claim 12, further comprising: receiving location uncertainty and location information from a plurality of location aware devices, wherein calculating, within the location unaware device, the location for the location unaware device is based on the received locations and location uncertainties.

14. The method of claim 1, wherein the first communication protocol is nested with the second communication protocol.

15. The method of claim 1, wherein the first communication protocol is layered with the second communication protocol.

16. The method of claim 1, wherein the first communication protocol is interleaved with the second communication protocol.

17. A system comprising: one or more circuits and/or processors for use in a femtocell configured to:

wirelessly transmit from a location unaware device, a request for location information;

receive by the location unaware device a location of a location aware device, wherein the wirelessly transmitting and the receiving utilize a first communication protocol that is integrated with a second communication protocol, wherein the second communication protocol is a Bluetooth protocol, wherein the request for location information is encapsulated in a packet in accordance with the Bluetooth protocol, and wherein the location of the location aware device is encapsulated within a packet formatted in accordance with the Bluetooth protocol;

determine a relative direction from the location aware device to the location unaware device;

determine a relative distance between the location aware device and the location unaware device; and calculate, within the location unaware device, the location for the location unaware device based on: the received location, the relative direction from the location aware device to the location unaware device, and the relative distance between the location aware device and the location unaware device.

18. The system of claim 17, wherein the first communication protocol is nested with the second communication protocol.

* * * * *